US005473638A

United States Patent [19]

Marchetto et al.

[11] Patent Number: 5,473,638

[45] Date of Patent: Dec. 5, 1995

[54] DIGITAL SIGNAL PROCESSOR DELAY EQUALIZATION FOR USE IN A PAGING SYSTEM

[75] Inventors: Robert F. Marchetto, Burnaby; Todd A. Stewart, West Vancouver, both of Canada

[73] Assignee: Glenayre Electronics, Inc., Charlotte, N.C.

[21] Appl. No.: 1,318

[22] Filed: Jan. 6, 1993

[51] Int. Cl.$^6$ .......... H04L 7/00

[52] U.S. Cl. .......... 375/356; 375/355; 375/357; 370/108; 455/51.2; 455/561; 455/334; 364/723; 379/59; 348/518; 348/538; 327/161; 327/261; 327/276

[58] Field of Search .......... 375/106, 107, 375/108, 354, 357; 370/100.1, 108; 348/518, 538; 455/522, 53.1, 57.1, 33.4, 56.1; 364/723; 379/59; 327/161, 261, 276

[56] References Cited

U.S. PATENT DOCUMENTS

| | | | |
|---|---|---|---|
| 4,255,814 | 3/1981 | Osborn | 455/51 |
| 4,439,046 | 3/1984 | Hoppe | 368/120 |
| 4,453,259 | 6/1984 | Miller | 375/106 |
| 4,472,802 | 9/1984 | Pin et al. | 370/104 |
| 4,481,647 | 11/1984 | Gomkert et al. | 375/107 |
| 4,626,217 | 12/1986 | Tardif et al. | 434/8 |
| 4,696,051 | 9/1987 | Breeden | 455/33 |
| 4,696,052 | 9/1987 | Breeden | 455/51 |
| 4,718,109 | 1/1988 | Breeden et al. | 455/51 |
| 4,719,375 | 1/1988 | Martin | 307/600 |
| 4,807,257 | 2/1989 | Schouhamer Immink et al. | 375/106 |
| 4,821,297 | 4/1989 | Bergmann et al. | 375/106 |
| 5,031,230 | 7/1991 | Sandahl et al. | 455/50 |
| 5,038,403 | 8/1991 | Leitch | 455/51 |
| 5,060,240 | 10/1991 | Erickson et al. | 375/38 |
| 5,172,396 | 12/1992 | Rose, Jr. et al. | 375/107 |
| 5,245,647 | 9/1993 | Grouffal et al. | 375/106 |
| 5,245,667 | 9/1993 | Lew | 375/106 |
| 5,257,404 | 10/1993 | Goreham et al. | 375/107 X |

FOREIGN PATENT DOCUMENTS

| | | | |
|---|---|---|---|
| 0285413 | 10/1988 | European Pat. Off. | H03H 17/06 |

*Primary Examiner*—Stephen Chin
*Assistant Examiner*—Amanda T. Le
*Attorney, Agent, or Firm*—Christensen, O'Connor, Johnson & Kindness

[57] ABSTRACT

A method and apparatus provide an equalization time delay to synchronize a plurality of paging transmitters in a simulcast paging system. A delay equalization circuit (41 ) appropriate for use with an analog input signal includes a coder/decoder (CODEC) (50) and a digital signal processor (DSP) (58). An analog input signal is digitized or sampled by an analog-to-digital converter (ADC) in the CODEC, producing corresponding digital values that are input to the DSP. The DSP employs a selected finite impulse filter to interpolate between the sampled digital values from the CODEC to provide enhanced resolution in delaying a signal output that is output. The DSP determines a major sample index and an interpolated filter index to achieve the desired equalization time delay. These variables define two delay intervals that are combined to provide the required equalization time delay. As each sampled digital value is produced, the delayed value is output and converted by a digital-to-analog converter (DAC) 54 in the CODEC to an analog signal having the corresponding required delay. By thus providing the appropriate equalization time delay to the signal transmitted by each paging transmitter in a simulcast paging system 20, differences in the time required for the analog signal to propagate from a paging terminal to each paging transmitter are compensated, thereby substantially eliminating phase interference in overlap zones of the paging transmitters.

29 Claims, 6 Drawing Sheets

DIGITAL SIGNAL PROCESSOR DELAY EQUALIZATION FOR USE IN A PAGING SYSTEM

FIELD OF THE INVENTION

The present invention is principally related to a method and apparatus for delaying signals, and more specifically, to a method and apparatus for equalizing the delays incurred by signals propagated over different length paths in a paging system.

BACKGROUND OF THE INVENTION

In a simulcast paging system, a central paging terminal typically sends a signal to several transmitters for retransmission into overlapping reception zones. To avoid phase interference in pagers receiving transmissions from multiple transmitters, the signals from all of the transmission sites should be synchronized to within ± one microsecond (μs). However, the signal from the central paging terminal often reaches the transmission sites at different times, because it propagates over radio frequency (RF) and/or telephone links of substantially different length. It is thus important to provide an appropriate equalizing delay before the signal is transmitted to a pager from each site to compensate for the different time delays incurred as the signal travels to the transmitters in order to synchronize transmission of the signal from all of the transmitters. The transmitter associated with the link having the longest propagation time does not require any additional equalizing delay to be added before transmitting the signal, but all other transmission sites receiving the signal earlier in time do. The equalizing time delays required to synchronize transmission of the signal from the various sites may range from a few μs to several hundred μs.

Methods for delaying a signal are well known in the art. For example, an analog voice signal that is converted to a digital signal by being sampled at a sample rate, $f_s$, can be stored in a microcomputer buffer for a desired delay time, and then converted back to an analog signal to achieve a desired equalization delay. However, to achieve a delay of 100 ms, with a resolution of 5 μs, an analog signal sampled to a digital resolution of 13 bits would require a sampling rate of 200 KHz. While 5 μs delay resolution has been acceptable for data rates of up to 2400 baud in the past, a lower value of delay resolution is required for simulcast systems operating at substantially higher data rates. Such straight forward techniques to obtain the required delay resolution for higher baud rates become impractical due to the size of the memory buffer and sampling rate that would be required.

Since the need for equalizing time delays so as to synchronize transmitters in a paging system is well known in the art, a variety of apparatus to provide the compensatory delay in the time before a signal is transmitted in a paging system have previously been developed. For example, as described in U.S. Pat. No. 4,317,220, a fixed delay line is inserted into the input line of each slave (remote transmission site) station to provide the requisite time delay to synchronize the transmitter at that site with other transmitters at different locations. However, details of the delay line are not disclosed. This technique is simply one implementation of the method initially discussed and is unusable at the delay resolution and data rates required for the reasons already noted.

As a further example of prior art solutions to this problem, U.S. Pat. No. 4,255,814 discloses a simulcast transmission system having a control center that includes an adjustable audio delay used to delay the audio or information signal that is broadcast by a simulcast transmitter. The adjustable audio delay disclosed in this reference comprises an integrated circuit bucket brigade device that provides a delay for the signal transmitted in accordance with delay data that are recalled from a storage circuit. The stored delay data for each transmission site is adjustable to compensate for changes in the link between the control center and the transmission site, by reprogramming the adjustable audio delay, thereby maintaining phase coherency at the point where transmissions from more than one site are received. A variable clock frequency input signal is used to determine the delay time provided by the bucket brigade device comprising the adjustable audio delay circuit. The technique for controlling the delay disclosed in this reference lacks the resolution to truly synchronize the transmission sites; moreover, it requires relatively complex circuitry, even though it uses an integrated circuit (IC) specifically designed to provide an adjustable delay. This reference also suggests that the signal to be transmitted can be digitized and a microprocessor used to delay the signal, but the patent does not disclose how a signal is delayed with the microprocessor. Bucket brigade devices are not common circuit components and tend to be expensive. Moreover, these devices tend to introduce an undesirable level of distortion in the signal being delayed. Consequently, this technique for delaying a signal is not an acceptable solution to the problem.

Conventionally, a signal that is to be delayed with a microprocessor is digitized and the digital values representing the signal are stored in a first-in, first-out (FIFO) memory circuit that delays the signal by the time required to fill the storage device. A similar, although more expensive, storage device having a variable buffer capacity can be controlled by a microprocessor or by a coder/decoder (CODEC) so that the capacity of the buffer is changed as necessary to provide a desired delay between the time at which a digital signal is applied to the input of the buffer and the time that it is available at the output of the buffer. As a further alternative, a continuously variable slope technique can be used to provide a programmable delay of a signal. A relatively simple circuit will provide delays from about 0 to 5 ms, in minimum steps of approximately 5 μs; however, this technique causes excessive distortion in the signal.

From the preceding description of the prior art, it should be apparent that an efficient, low cost method and apparatus are required for providing time delays to appropriately equalize the time at which a signal is transmitted by different transmission sites in a paging system. The apparatus and method should be capable of providing delays ranging from a few μs as to about 100 ms, with a resolution in the ± 1 μs range.

SUMMARY OF THE INVENTION

In accordance with the present invention, a method is defined for providing a required equalization time delay to a signal. The method comprises the steps of digitizing an analog input signal by sampling it at a fixed rate, producing a plurality of successive sampled digital values. Each successive sampled digital value corresponds to a value of the analog input signal at successively later points in time. The successive sampled digital values are stored. Next, at least one digital interpolated value is produced by interpolating between the successive sampled digital values that are stored. The digital interpolated value corresponds to a value of the analog input signal at a point in time occurring between times at which the analog input signal is sampled at the fixed rate and is therefore determined more often than the sampled digital values. The digital interpolated value is used to produce an output signal that is thus delayed by the required equalization time delay and the delay provided the output signal is at a higher resolution than that associated with the sampled digital values.

In a first embodiment, the step of interpolating preferably comprises the step of filtering the sampled digital values with a plurality of finite impulse response filters. Specifically, the first preferred method includes the step of multiplying a predefined number of successive sampled digital values by predefined coefficients, producing a plurality of products. The total of the products is determined and is equal to the digital interpolated value.

A second preferred method for determining the at least one digital interpolated value includes the steps of determining an N-order series approximation of the input signal between successive sampled digital values. Each digital interpolated value is then determined as a function of the desired delay time, the sampled digital values and the N-order series approximation. The accuracy of the digital interpolated values increases as N increases.

In determining the at least one digital interpolated value, the required equalization time delay to be applied is first identified. The required equalization time delay is divided by the fixed rate (at which sampling of the input signal occurs) to determine an integer number, I, representing a number of periods during which the sampled digital values are produced before the output signal is provided; this number of periods comprises a portion of the required equalization time delay. The digital interpolated value that occurred between the $(I-1)_{th}$ and the $I_{th}$ successive sampled digital values is chosen so as to provide a remainder of the required equalization time delay.

Apparatus for delaying a signal that is propagated to a transmitter in order to equalize its propagation time relative to the propagation time for the signal to arrive at another transmitter is another aspect of the present invention. The elements of the apparatus generally function consistent with the steps of the method described above.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENT

Simulcast Paging System

Figure 1:
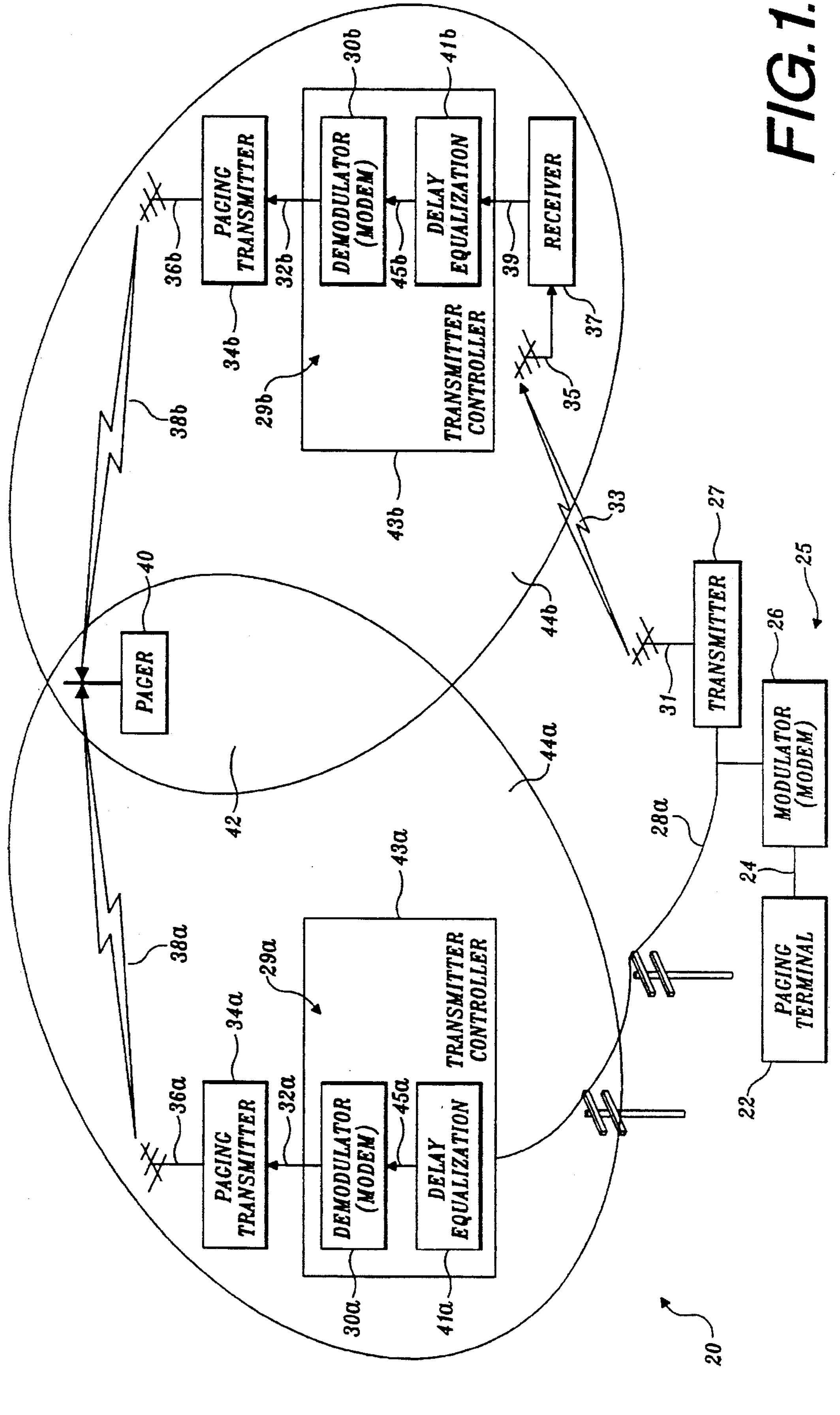
FIG. 1 is a block diagram illustrating a simplified simulcast paging system that includes two transmission sites linked to a central paging terminal by different propagation paths and employing the present invention to synchronize the transmission of a signal from each site.

A simulcast paging system in which the present invention is used is shown in FIG. 1, generally at reference numeral 20. Simulcast paging system 20 includes a paging terminal 22, which is a source of data messages that are transmitted to specific pager units carried by customers subscribing to the simulcast paging system. Such data messages are typically generated by other equipment (not shown) that is connected to paging terminal 22, as will be apparent to those of ordinary skill in the art. Associated with paging terminal 22 and connected to it by a data line 24 is a modem 25. (The term modem is a contraction of two words—"modulator" and "demodulator.") In simulcast paging system 20, paging terminal 22 most often transmits modulated data messages to a plurality of paging transmitters 34 rather than receiving messages, and the modulator of modem 25 receives much more use than the demodulator. Therefore, modem 25 is hereafter referred to simply as modulator 26, it being understood that both the modulator and demodulator functions of the modem are available to paging terminal 22.

The data messages input to modulator 26 from paging terminal 22 are typically in the form of non-return to zero (NRZ) data; however, other data formats can also be modulated by modulator 26, including analog data in the form of compressed voice communications. As explained below, modulator 26 produces a modulated signal that conveys the data supplied from paging terminal 22 to each of the plurality of paging transmitters 34. In FIG. 1, only two such paging transmitters 34*a* and 34*b* are shown for purposes of illustration, but it will be understood that simulcast paging system 20 typically includes many more such paging transmitters, some of which may be connected to paging terminal 22 by a radio frequency (RF) link 33, as is paging transmitter 34*b*, instead of by telephone lines 28*a*, as is paging transmitter 34*a*. Each of these links introduces a propagation delay between the time that a signal is transmitted from paging terminal 22 until it arrives at the different paging transmitters. As noted above, these propagation delays are often significantly different, ranging from a few μsec to several msec.

The modulated signal produced by modulator 26 is conveyed over telephone lines 28 *a* and transmitted by a transmitter 27 from an antenna 31 to corresponding modems 29*a* and 29*b*, respectively. In the case of paging transmitter 34*b*, an antenna 35 receives the modulated signal and supplies it to a receiver 37. Transmitter controllers 43 located at each paging transmitter site include modems 29, and delay equalization circuits 41 in accordance with the present invention. Alternatively, delay equalization can be provided for each transmitter site at paging terminal 22. However, in the preferred embodiment, the modulated signal conveyed by telephone lines 28 is input to a delay equalization circuit 41*a* in transmitter controller 43*a*, and after being appropriately compensated for the transmission propagation delay, is input to modem 29*a* on a line 45*a*. Similarly, a received modulated signal output from receiver 37 is coupled by a line 39 to delay equalization circuit 41*b* in transmitter controller 43*b*. After an appropriate compensating time delay is applied by delay equalization circuit 41*b* to synchronize the transmission of the signal with that from each of the other paging transmitters 34, the modulated signal is input over a line 45*b* to modem 29*b*.

Any differences in the time required for the modulated signal to propagate from modulator 26 to each paging transmitter 34 is thus compensated in their corresponding transmitter controllers 43*a* and 43*b* by delay equalization circuits 41, which add appropriate compensating time delays to the signal path to achieve a delay that is at least equal to the longest propagation delay for the signal to reach any paging transmitter 34 in the system. Yet, even the link having the longest propagation delay has a fixed minimum delay added by delay equalization circuit 41 before the signal is transmitted from its paging transmitter; this fixed minimum delay is introduced as an artifact of the processing of a signal, even when no additional delay is required, as will be explained further.

Since the paging transmitters primarily use the demodulator portion of modems 29 for demodulating data messages transmitted from paging terminal 22, they have only an occasional need of the modulator portion of the modem. Accordingly, modems 29*a* and 29*b* are hereafter referred to simply as "demodulators" 30*a* and 30*b*. Nevertheless, the modulator capability of the modems installed at the paging transmitters is available to paging transmitters 34*a* and 34*b* when needed and is periodically used by them for transmission of system-related data messages back to paging terminal 22, for example, in responding when each paging transmitter is occasionally polled in sequence by the paging terminal. The polling of a paging transmitter can be used to determine the actual propagation delay. Since the time between transmission of a polling request by paging terminal 22 and the receipt of a response from a particular paging transmitter can be measured, and the delay between the transmission from a paging transmitter to a monitoring receiver at the paging terminal is known (due to known distances between the transmitter and receiver), actual propagation delay can be determined.

Demodulators 30 process the modulated signal transmitted via telephone lines 28 *a* and/or RF radio link 33 from paging terminal 22, demodulating the signal after it has been appropriately delayed by delay equalization circuits 41 to produce the data message conveyed thereby, which is input to their corresponding paging transmitter 34. Paging transmitters 34*a* and 34*b* each modulate an RF carder at the same frequency, transmitting the data message through antennas 36*a* and 36*b*, respectively, as radio signals 38*a* and 38*b*. The radio transmissions are received by, for example, a pager unit 40, which is carded by a subscriber to the paging service who is the intended recipient.

Associated with each paging transmitter 34 is a reception zone 44 that is defined by the limits of usable signal strength of radio signals 38. If pager unit 40 is disposed within reception zone 44*a* of paging transmitter 34*a*, but is not within reception zone 44*b* of paging transmitter 34*b* (or the reception zone of any other paging transmitter), it responds only to radio signal 38*a* of paging transmitter 34*a*. On the other hand, if pager unit 40 is disposed within an overlap area 42 of reception zones 44*a* and 44*b* of paging transmitters 34*a* and 34*b*, it receives and may respond to radio signals 38*a* and 38*b* from both paging transmitters. Accordingly, to avoid phase interference between the signals from paging transmitters 34*a* and 34*b*, it is essential that the two paging transmitters transmit a signal received from paging terminal 22 in synchronization. Delay equalization circuits 41 thus provide the appropriate delay times to compensate for differences in the propagation time required for a signal from paging terminal 22 to reach the paging transmitters, enabling synchronization of the signal's transmission from paging transmitters 34, so that phase interference in overlap area 42 is substantially eliminated.

Figure 2:
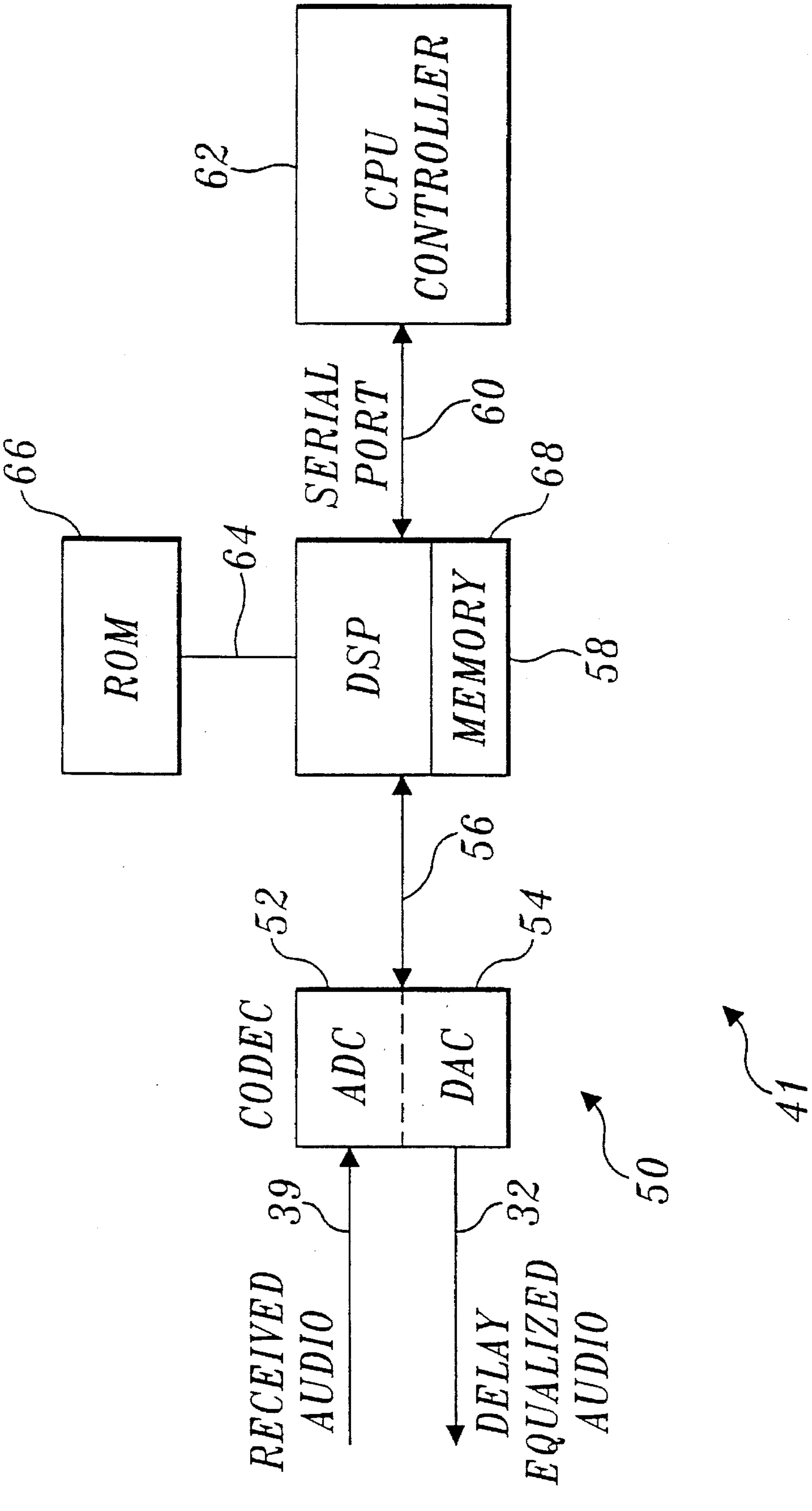
FIG. 2 is a block diagram of a delay equalization circuit in accordance with the present invention.

Details of delay equalization circuit 41 are illustrated in FIG. 2. An analog audio signal, for example, from receiver 37, is conveyed on line 39 to the input of a CODEC 50, i.e., to the input of an analog-to-digital converter (ADC)52 comprising the CODEC. CODEC 50 also includes a digital-to-analog (DAC) converter 54 that is coupled to line 32 for conveying the delayed equalized audio signal to demodulator 30 after it has been appropriately delayed to compensate for differences in the propagation time for the signal from paging terminal 22 to reach each of paging transmitters 34. Lines 56 bi-directionally couple CODEC 50 to a digital signal processor (DSP) 58 to convey the digitized audio signal from ADC 52 to DSP 58. In addition, lines 56 convey the delayed digital signal from DSP 58 to DAC 54, so that it can be converted back to an analog signal and output on line 32.

DSP 58 is programmed to provide an appropriate equalizing delay time to the signal after it has been digitized by ADC 52. The required equalization time delay that should be implemented by DSP 58 is defined by a signal input to the DSP through a serial port line 60, which is coupled to a central processing unit (CPU) controller 62. CPU controller 62 includes its own read only memory (ROM) and random access memory (RAM) (neither separately shown) in which the required equalization time delay is stored, along with the programming that causes it to supply the time delay to DSP 58. Alternatively, CPU 62 determines the required equalization time delay based on measurements of the time required for a signal to propagate bi-directionally between delay equalization circuit 41 and transmitter 27 (in FIG. 1 ). Details concerning the measurement or determination of the required equalization time delay are not particularly relevant to this invention and thus are not further discussed herein.

Line 64 connects a ROM 66 to DSP 58. When DSP 58 is reset or initially energized, programming stored in ROM 66 is loaded into DSP 58, thereafter enabling it to delay the digital signal received on lines 56 by the desired equalization time delay, as explained below. Alternatively, DSP 58 can access the programming stored in ROM 66 as needed during the execution of the delay.

Figure 3:
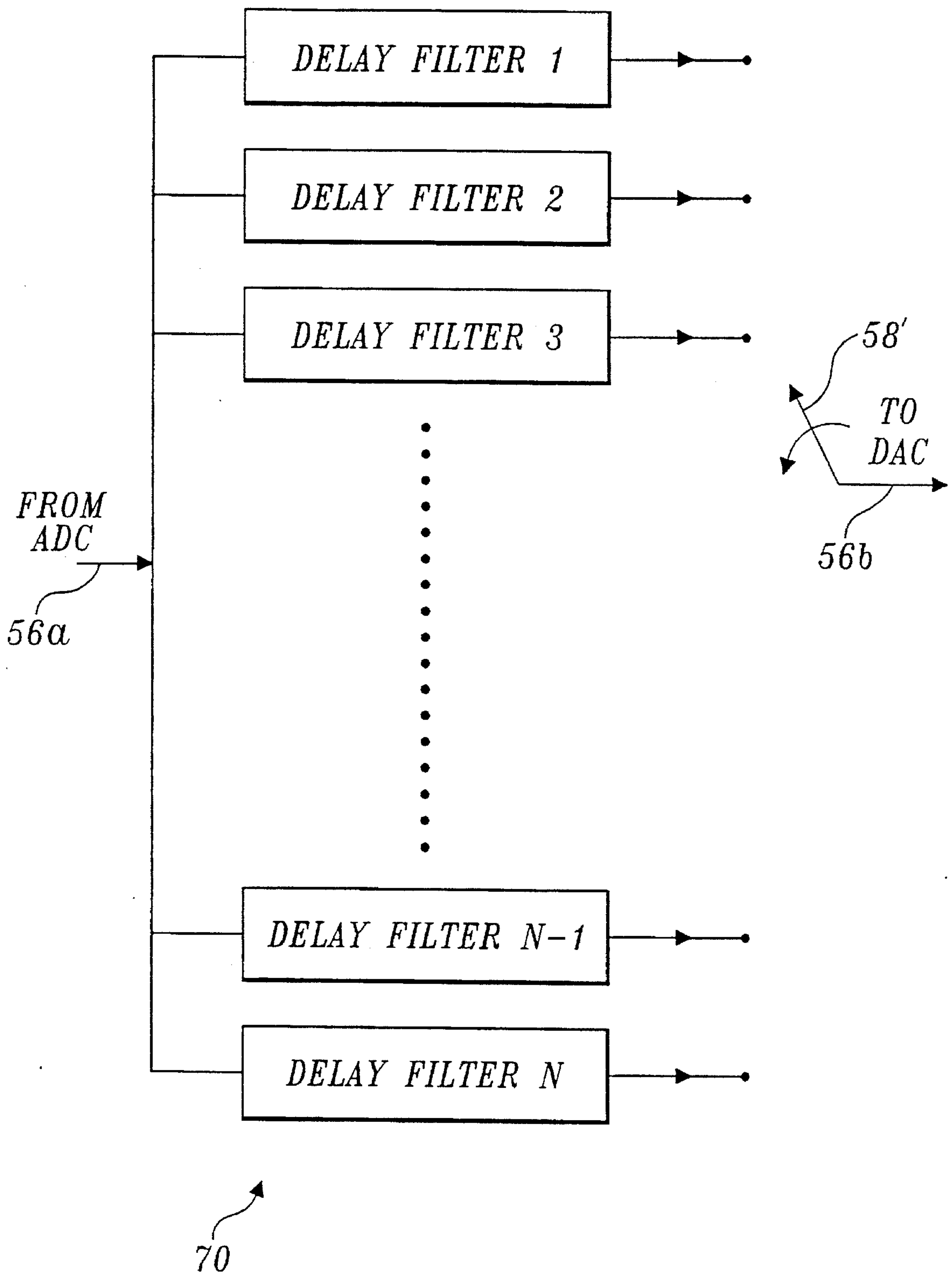
FIG. 3 schematically illustrates selection of a specific delay filter to provide a required equalization time delay.

In providing the required equalization time delay for the signal that is input to delay equalization circuit 41, two different approaches are available. In a first preferred embodiment, one of N different digital delay filters 70 is selected by DSP 58, each digital delay filter 1 through delay filter N providing an incrementally longer delay than the preceding digital delay filter. The digital delay filters comprise finite impulse response (FIR) filters. The digital samples of the analog signal produced in CODEC 50 by ADC 52 comprise the digital values that are input to the selected digital delay filter 70 as shown in FIG. 3. DSP 58 identifies the specific one of the N digital delay filters that is required to provide the equalization time delay, selects that filter (implements it by digital processing), and provides the time delayed digital signal as an output over a line 56*b*. Line 56*b* conveys the delayed digital value to DAC 54 in CODEC 50. The delayed digital value and subsequent correspondingly delayed digital values are then converted by DAC 54 to an analog output signal that is conveyed over line 32 to paging transmitter 34.

The greater number of digital delay filters 70 that are available in delay equalization circuit 41, the higher the resolution with which the required equalization time delay can be provided. In the preferred embodiment, ADC 52 provides an analog-to-digital conversion rate, i.e., digitally samples the analog signal at a rate of 19.2 KHz, so that sampled digital values are produced every 52 μs. Furthermore, the preferred embodiment of the delay equalization circuit allows selection of one of at least 52 digital delay filters 70 during the interval between each sampled digital value produced by ADC 52 to define an intermediate interpolated value for the analog signal, with a resolution of ± 0.5 μs. Thus, the effective sample rate resolution provided by selecting the appropriate delay filter 70 is 1.0 MHz.

Figure 4:
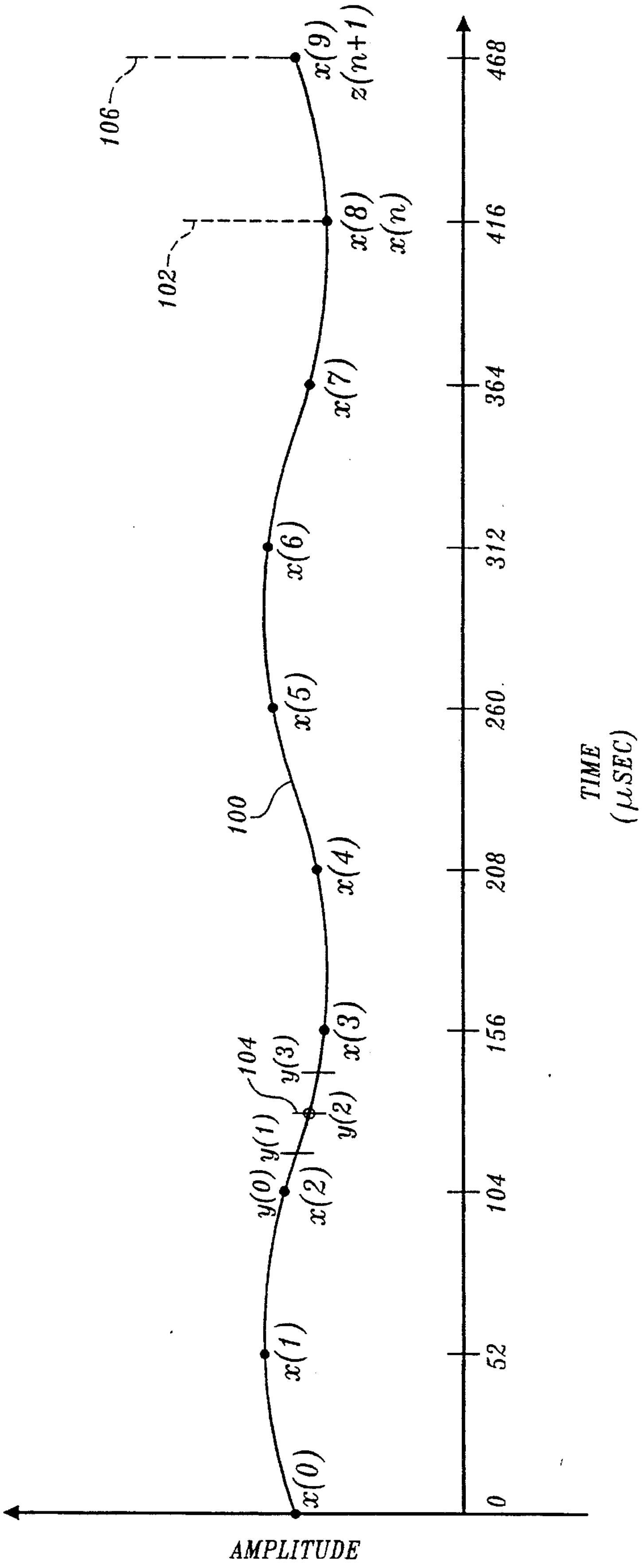
FIG. 4 is a graph of an analog signal over time, illustrating how the signal is digitally sampled at a fixed rate and showing the points at which the value of the signal is interpolated between two of the digitally sampled values.

In FIG. 4, the amplitude of an analog signal 100 is illustrated as it varies over an interval of time extending from zero through 468 μs. The sampled digital values corresponding to an instantaneous amplitudes of analog signal 100 determined by ADC 52 are identified by dots, x(0) through x(9), which are spaced apart at 52 microsecond intervals. Although it would be possible to delay the digital input signal by storing the sampled digital values x(i) in a buffer on a FIFO basis, so that each digitized sample stored in the buffer is delayed by an integer number of sample intervals, doing so would provide a resolution of only ±52 μs—much too coarse to meet the requirements of synchronization in simulcast paging system 20. Instead, delay equalization circuit 41 interpolates between major samples x(i) using one of digital delay filters 70 to provide the required resolution in the time that the output signal is delayed.

As a simplified exposition of the process used in interpolating between sampled digital values x(i), only four such digital interpolated values y(0) through y(3) are illustrated (instead of 52) and only between the sampled digital values at x(2) and x(3). This relatively limited interpolation only improves the affective resolution by a factor of 4, but it should be readily understood that the interpolation is easily extended, as in the preferred embodiment, so that any one of 52 (or more) interpolated values can be obtained between each major sample x(i).

The interpolated samples y(0) through y(3) are determined using the following FIR filter equations:

$$y(0)=a_{00}x(0)+a_{01}x(1)+a_{02}x(2)+a_{03}x(3)+a_{04}x(4)+a_{05}x(5) \quad (1)$$

$$y(1)=a_{10}x(0)+a_{11}x(1)+a_{12}x(2)+a_{13}x(3)+a_{14}x(4)+a_{15}x(5) \quad (2)$$

$$y(2)=a_{20}x(0)+a_{21}x(1)+a_{22}x(2)+a_{23}x(3)+a_{24}x(4)+a_{25}x(5) \quad (3)$$

$$y(3)=a_{30}x(0)+a_{31}x(1)+a_{32}x(2)+a_{33}x(3)+a_{34}x(4)+a_{35}x(5) \quad (4)$$

where the values $a_{00}$ through $a_{35}$ are predefined constant coefficients.

In Equation 1, since y(0) equals x(2) in FIG. 4, it is apparent that the coefficients $a_{02}$= 1 and $a_{0n}$= 0 (n not equal to 2). The other coefficients for Equations 2 through 4 and comparable equations for higher resolution digital interpolated values actually used in the preferred embodiment are readily derived by people of ordinary skill in the art of digital signal processing. By selecting a specific digital interpolated value between any two sampled digital values x(i) and x(i+1), a fractional time delay between the two sampled digital values is readily determined. Based upon an inspection of Equations 1 through 4 above with respect to FIG. 4, it is apparent that a digital interpolated value for the analog signal 100 at a time between sampled digital values x(2) and x(3) can not be determined until after sampled digital value x(5) has been produced by ADC 52. At the time the next sampled digital value x(6) is produced, a digital value corresponding to the amplitude of analog signal 100 at any of the interpolated points y(n) between x(2) and x(3) can be provided with an apparent time delay ranging between 156 microseconds and 208 microseconds. For the example presented in FIG. 4 where only four digital interpolated values are determined, the resolution with which a time delay can be provided is only ±6.5 μs. However, by extension of the digital interpolation from four to 52 or more points between each sampled digital values, the required minimum resolution of at least ± one μs is obtained.

It should also be apparent that instead of providing a signal delayed for only a portion of the 52 μs period between successive sampled digital values, a longer delay equal to one or more integer multiples of the 52 μs interval can be achieved. This longer delay has the same resolution noted above with respect to a delay that is less than the 52 μs interval because it comprises the sum of a "gross time delay," representing the integer multiple of the interval, and a "fine time delay," representing a portion of that interval. Thus, the signal output from delay equalization circuit 41 can readily be delayed by more than 100 ms, limited only by the temporary storage required to hold the successive sampled digital values and the delayed digital values. DSP 58 includes an internal memory 68 for storing sufficient sampled digital values taken over more than 100 ms, but either additional memory capacity or an external memory circuit can be provided to store more sampled digital values and a delayed digital interpolated value determined as a function of those sampled digital values. It will be apparent that the digital interpolated value can be determined before it is required and stored or can be determined at the time that the delayed value is required. In either case, the digital interpolated value is either "stored" in the memory circuit for at least part of the sample interval, or briefly in a register at the time it is determined.

The equalization time delay provided by this method using delay equalization circuit 41 is defined by a major sample index I, which represents the number of sampled digital values included in delaying the output signal, and an interpolation filter index j that defines the specific digital interpolated value selected between the sampled digital values to define the delayed sample that is output as each successive sampled digital value is produced. Accordingly, the major sample index I is defined by:

$$I=(T \text{ div } P)+5 \quad (5)$$

where T is the desired equalization time delay, and P is the period between successive sampled digital values. Similarly, the interpolation filter index j is defined by:

$$j=(N-1)-\text{round}(\text{rem}(T/P)*N) \quad (6)$$

where N is the number of interpolation filters, "rem" is the remainder of the division quotient, and "round" is the result of rounding (up or down) to the nearest integer, following conventional rounding rules.

In determining the time delay that is provided by selecting I and j, it should be noted that there exists a fixed minimum delay $T_{min}$ defined by:

$$T_{min}=3P+\frac{P}{N} \quad (7)$$

The minimum delay includes one period P because a delayed digital value is not output by DSP 58 until the next time that a sampled digital value is produced following the determination of the delayed digital value, and the remainder of the minimum delay is an artifact of the calculation of a digital interpolated value. The digital interpolated value can not be determined until several sampled digital values are produced, including three such sampled digital values produced after the interval occurs in which the amplitude of the analog signal is to be determined by the interpolation process.

A more specific example should help to clarify the above-noted considerations. In this example, it is assumed that a delay of 182 μs is required to synchronize the signal with that transmitted by the paging transmitter having the longest propagation delay time. In this example, the sample period, P, is 52 μs, and the number of interpolation filters, N, is 52. Accordingly, the major sample index I is determined as follows:

$$I=(182\ div\ 52)+5=8 \tag{8}$$

Applying Equation 6, the interpolation filter index j is determined as follows:

$$j=(52-1)-round(rem(182/52)*52)=25 \tag{9}$$

The value of the delayed signal x(n) is determined as shown in FIG. 4 at a time 102 corresponding to the time that the eighth sampled digital value x(8) is produced, but the delayed signal is not output until the next sampled digital value is produced, i.e., at a time 106. A delay $T_1$ before the digitally interpolated value of analog signal 100 is calculated at time 102, i.e., calculated to determine the digital value of the analog signal at a time 104, is:

$$T_1=(I-2)P-\frac{j}{N}P=(8-2)52-\frac{25}{52}52=287\ \mu s \tag{10}$$

The delay includes part (105 μs) of the minimum delay time, but since the delayed value is not output from delay equalization circuit 41 until the next sampled digital value is produced at time 106, the total delay $T_{total}$ is (287+52) or 339 μs. Thus the total delay includes the desired delay equalization time of 182 μs and the fixed minimum delay time of 157 μs. However, each delay equalization circuit 41 introduces the same minimum delay time, including the delay equalization circuit associated with the paging transmitter having the longest propagation delay. As a result, the 182 μs equalization delay time that was required is provided relative to the time at which the signal is available for transmission by the paging transmitter having the maximum propagation delay time.

As noted above, two alternative approaches can be used to interpolate between the digital samples of the analog signal. Instead of using FIR filters to carry out the interpolation process, delay equalization circuit 41 can determine an appropriate interpolated value between two successive sampled values using a series approximation of the analog input signal between the two sampled values. This interpolated value is based on the desire fractional delay required between the times at which of the two sampled values in question. The accuracy and resolution of the interpolated value is selectively determined by the algorithm used. For example, the accuracy of the interpolated value is a function of the order of the series approximation of the analog signal used to determine the value.

Although other types of series approximations may be used to determine the interpolated values, a Taylor series clearly illustrates the technique. The generalized Taylor series is represented by:

$$f(x)=f(b)+f'(b)(x-b)+\frac{f''(b)}{2!}(x-b)^2+\ldots+\frac{f^{(n)}(b)}{n!}(x-b)^n+\ldots \tag{11}$$

To simplify the following explanation, the sampled values x(1), x(2), and x(3) in FIG. 4 are represented by a, b, and c, respectively. Further, the desired delay time between the digital samples b and c is αP. To determine the interpolated value occurring at a time αP after digital sample b, a first, second, or higher order Taylor (or other type of series approximation of the analog input signal) can be determined as follows. For a sampling period P, one approximation of the first derivative of the Taylor series expressed in Equation (11) is:

$$f'(b)=\frac{f(c)-f(a)}{2P} \tag{12}$$

By substituting the approximation for the first derivative into Equation 11, the following first approximation for the interpolated value y(α) is obtained:

$$y(\alpha)=f(b+\alpha P)=f(b)+\frac{f(c)-f(a)}{2P}(b+\alpha P-b)=f(b)+\alpha\frac{(f(c)-f(a))}{2} \tag{13}$$

To improve the accuracy with which the interpolated value is obtained a second (or higher) order approximation of the series can be determined. An approximation of the second derivative of the series in Equation 11 is:

$$f''(b)=\frac{\frac{f(c)-f(b)}{P}-\frac{f(b)-f(a)}{P}}{P}=\frac{f(c)-2f(b)+f(a)}{P^2} \tag{14}$$

When the approximate second derivative of Equation 14 is substituted into Equation 11, a second order approximation of the interpolated value y(α) is obtained as:

$$y(\alpha)=f(b+\alpha P)=f(b)+\alpha\frac{f(c)-f(a)}{2}+\frac{\alpha^2}{2}(f(c)-2f(b)+f(a)) \tag{15}$$

The determination of the interpolated value based on the N-order approximation is extended for equalization delay intervals longer than P just as explained above with respect to the interpolated values determined by the FIR filter approach. In this way, equalization delays of virtually any time from fractional portions of the sampling period P to multiples of P are obtained. By using higher order series approximations, the accuracy of the interpolated value is correspondingly improved.

Figure 5:
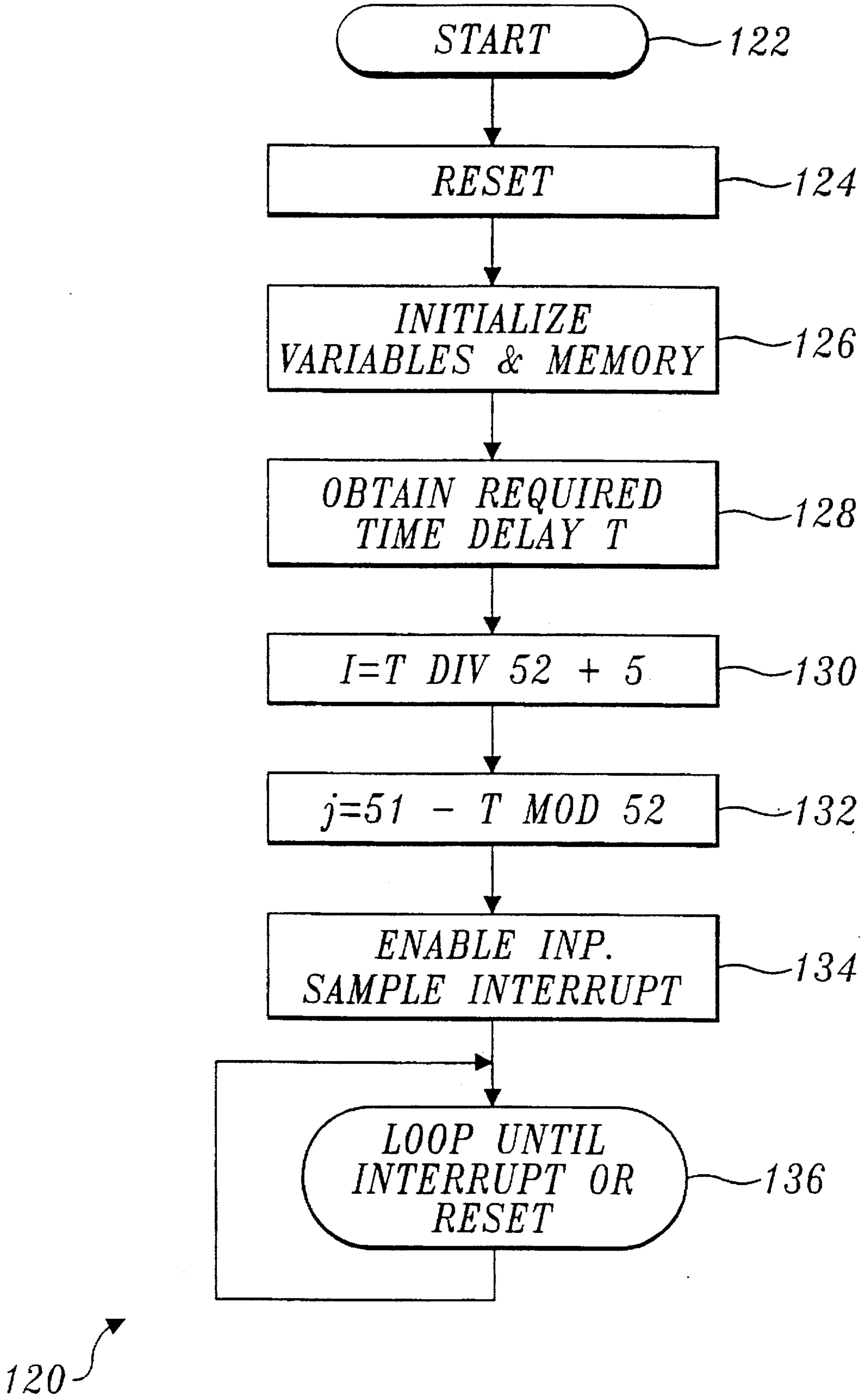
FIG. 5 is a flow chart that discloses the logical steps implemented in a main routine for determining and providing an equalization delay.
Figure 6:
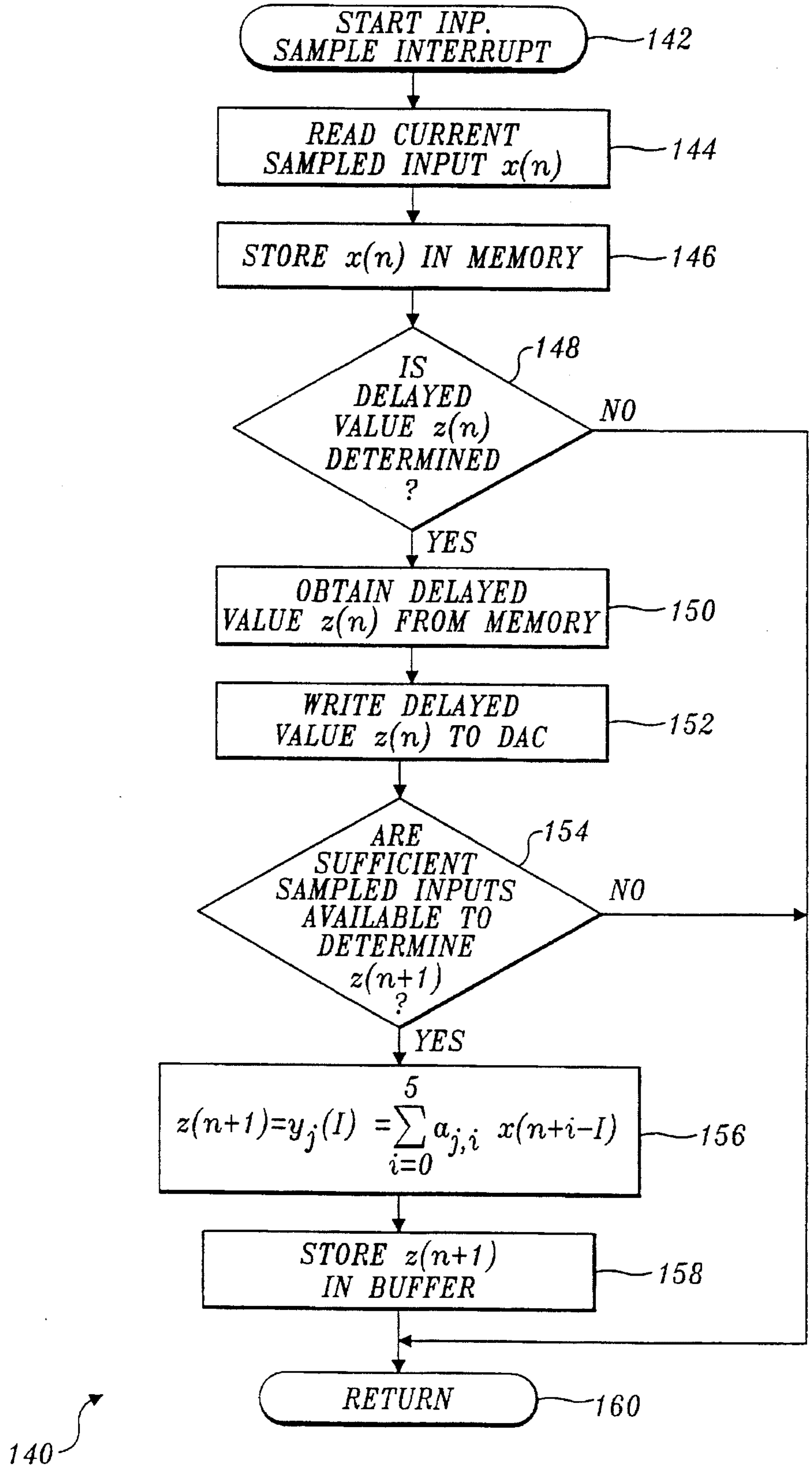
FIG. 6 is a flow chart disclosing the logic of an interrupt subroutine called in the flow chart of FIG. 5.

FIGS. 5 and 6 are flow chars showing the control logic used in implementing the method for delaying a signal in accordance with the present invention. In FIG. 5, a flow char 120 begins with a star block 122. In a block 124, DSP 58 is reset to an initial condition. Thereafter, a block 126 initializes all variables and clears memory 68 within DSP 58. Memory 68 provides temporary storage of variables, including the sampled digital values and the interpolated value (after it is determined) that will be output when the next sampled digital value is produced.

A block 128 indicates that DSP 58 obtains the required equalization time delay T from CPU controller 62. In a block 130, the major sample index I is determined using Equation 5. Similarly, in a block 132, Equation 6 is applied to determine the interpolation filter index j.

Block 134 enables an input sample interrupt routine and DSP 58 continues to loop as provided in a block 136 until the interrupt occurs, i.e., when the next digitized sample is provided, or alternatively, until such time that the DSP is reset.

In FIG. 6, a flow chart 140 shows the steps implemented during the input sample interrupt routine, which occurs each time that CODEC 50 samples the analog input supplied over line 39 to provide a corresponding digitized value, i.e., when each sampled digital value for the analog input signal is produced (at a 19.2 KHz rate in the preferred embodiment). In a block 144, a current sampled digitized value x(n) from ADC 52 is read by DSP 58. This sampled digitized value is stored in memory 68 by DSP 58 in a block 146.

A decision block 148 then determines if the number of sampled digitized values provided since the last reset is sufficient to determine a first delayed value z(n). As noted above, at least three sampled digital values must be provided following the interval in which the digital interpolated value is to be determined before that value can be calculated. If an insufficient number of sampled digital values have thus far been provided, the logic proceeds to a return block 160 and returns to the steps in flow chart 120 to await the next sampled digital value. However, after sufficient sampled digital values have been taken to determine the first delayed value, the logic proceeds to a block 150, which directs the DSP to obtain the delayed value z(n) that was determined after the last sampled digital value was provided, from memory 68 in DSP 58. The delayed value z(n) is then output by the DSP to DAC 54, in accordance with a block 152.

A decision block 154 determines if sufficient sampled inputs are available to calculate the next delayed value z(n+1), which must be available for output when the next sampled digital value is produced. In other words, this decision block ensures that sufficient periods P have elapsed to achieve the required equalization delay time, as defined by the major sample index I. If not, the logic proceeds to return block 160; otherwise, the logic proceeds to a block 156. In block 156, the major sample index I and interpolation filter index j are used to calculate the next delayed value z(n+1), using the finite impulse response filter coefficients $a_{j,i}$ appropriate for the specific interpolated value identified by interpolation filter index j. Alternatively, the series approximation approach is used to determine the interpolated value that will be used for delayed value z(n+1). In a block 158, the next delayed value z(n+1) is stored in the memory of DSP 58 so that it is available for output when the next sampled digital value occurs, which will cause the input sample interrupt routine illustrated in flow chart 140 to be implemented. The logic then proceeds to return block 160 to continue looping as instructed in block 136.

As successive delayed values z(n) are output, DAC 54 processes the delayed digital values, producing a corresponding analog signal that has been delayed by delay equalization circuit 41 for the required time interval. It should be noted that the delayed digital values output from DSP 58 over line **56*b*** can also be input without conversion to analog format, to a demodulator or other device that can accept a digital format delayed signal.

Although the preferred embodiment employs a separate delay equalization circuit at each remote paging transmitter site, as noted previously, appropriate delay equalization can be provided in the signal transmitted to the remote paging transmitter sites to compensate for the different propagation delay times for such signals. In this case, the delay equalization circuit for each paging transmitter would be provided at paging terminal 22.

These and other modifications to the preferred embodiment of the present invention will be apparent to those of ordinary skill in the art in view of the claims that follow. Although the preferred embodiment and modifications thereto have been disclosed, it is not intended that such disclosure in any way limit the scope of the invention. Instead the scope of the invention should be determined entirely by reference to the claims that follow.

The embodiments of the invention in which an exclusive property or privilege is claimed are defined as follows:

1. A method for compensating differences in propagation times for signals transmitted from a source to a plurality of transmitters in a paging system, so that the plurality of transmitters transmit the signal in synchronization, comprising the steps of:

(a) converting an analog input signal to a digital format by sampling the analog input signal at a first predefined sample rate to produce corresponding sampled digital values, each sampled digital value representing an amplitude of the analog input signal at the time it was sampled;

(b) determining required delay intervals for each transmitter to ensure that the plurality of transmitters are synchronized;

(c) producing at least one digital interpolated value that represents an amplitude of the analog input signal at a time intermediate the times at which the sampled digital values were produced;

(d) storing the sampled digital values and the at least one digital interpolated value; and (e) at a second sample rate, selecting an appropriate one of the stored sampled digital values and the at least one digital interpolated value for at least one transmitter to introduce a time delay in the signals transmitted by said at least one of the plurality of transmitters, such that the time delay thus introduced in said signals is substantially equal to a required delay interval for said one of the plurality of transmitters and substantially synchronizes the plurality of transmitters.

2. The method of claim 1, wherein the step of determining the required delay interval for at least one transmitter comprises the steps of:

(a) determining a maximum propagation time from among the propagation times for all of the plurality of transmitters; and (b) determining delay times that should be applied to the signals transmitted by each of the transmitters so that a total of the propagation time for the signal to reach a transmitter and the delay time selected for that transmitter equals a total of the maximum propagation time and a fixed delay time, thereby ensuring that the signals are transmitted by the plurality of transmitters at substantially the same time.

3. The method of claim 1, wherein the step of producing the at least one digital interpolated value comprises the step of filtering the sampled digital values.

4. The method of claim 3, wherein the step of filtering, for each digital interpolated value, comprises the steps of:

(a) multiplying a predefined number of successive sampled digital values by predefined coefficients, producing a plurality of products; and (b) determining a total of the products.

5. The method of claim 2, wherein a predefined number of sampled digital values are stored over a time interval at least equal to the maximum propagation time for all of the plurality of transmitters.

6. The method of claim 1, wherein the step of producing the at least one digital interpolated value comprises the step of interpolating between selected sampled digital values to define an estimate of the analog input signal at a time intermediate two of the selected sampled digital values.

7. The method of claim 1, wherein the first predefined sample rate is substantially equal to the second sample rate, each time delay being equal to a time interval extending over an integer number of sample periods and a fractional portion of a sample period defined by the digital interpolated value selected.

8. The method of claim 1, wherein the time delays for all of the plurality of transmitters include a minimum delay.

9. The method of claim 1, wherein the step of producing the at least one digital interpolated value comprises the steps of determining an N-order series approximation of the analog input signal between successive sampled digital values, where N is a positive integer; and determining the at least one digital interpolated value as a function of a desired time delay, the sampled digital values, and said N-order series approximation, an accuracy of the at least one digital interpolated value improving as N increases in value.

10. A method for providing a required equalization time delay in an output signal transmitted from a site, to compensate for differences in time at which an analog signal is received by the site and by one other site, comprising the steps of:

(a) digitizing the analog signal by sampling it at a fixed rate, producing a plurality of successive sampled digital values, each successive sampled digital value corresponding to a value of the analog signal at successively later points in time;

(b) storing a predefined number of the successive sampled digital values;

(c) interpolating between the successive sampled digital values that were stored to produce a digital interpolated value that corresponds to a value of the analog signal at a point in time occurring between times at which the analog signal is sampled at the fixed rate; and (d) transmitting the digital interpolated value that was stored as the output signal, said output signal being delayed by a time interval equal to the equalization time delay so that it is transmitted substantially simultaneously with a corresponding output signal from the other site.

11. The method of claim 10, wherein the step of interpolating comprises the step of filtering the sampled digital values with a plurality of finite impulse response filters.

12. The method of claim 11, wherein the step of filtering comprises the steps of:

(a) multiplying a predefined number of successive sampled digital values that were stored by predefined coefficients, producing a plurality of products; and (b) determining a total of the products.

13. The method of claim 10, wherein the step of interpolating comprises the steps of:

(a) identifying the required equalization time delay to apply in providing the output signal;

(b) dividing the required equalization time delay by a reciprocal of the fixed rate to determine an integer number, I, of the successive sampled digital values corresponding to an interval of time during which the analog signal is digitized to produce those successive sampled digital values, said interval of time comprising at least a portion of the required equalization time delay; and (c) determining a digital interpolated value for a time that occurred between the $(I-1)_{th}$ and the $I_{th}$ successive sampled digital values to provide a remainder of the required equalization time delay.

14. The method of claim 10, wherein the step of interpolating includes the steps of determining an N-order series approximation of,the analog input signal between successive sampled digital values, where N is a positive integer; and determining each of the plurality of digital interpolated values as a function of a desired time delay, the sampled digital values, and said N-order series approximation, an accuracy of the interpolated values improving as N increases in value.

15. A method for providing a required equalization time delay for an analog signal that is received at one site from another location to compensate for differences in the time required for the analog signal to be received by another site from the other location, comprising the steps of (a) digitizing the analog signal received from the other location by sampling it at a fixed rate, producing a plurality of sampled digital values, x(n), each sampled digital value corresponding to a value of the analog signal at successively later points in time;

(b) temporarily storing a predefined number, N, of the sampled digital values;

(c) interpolating between a successive pair of sampled digital values that were stored, x(k−1) and x(k), to produce a digital interpolated value, $y_m$, that corresponds to a value of the analog signal at a point in time occurring between times at which the analog signal is actually sampled at the fixed rate; and (d) using the digital interpolated value $y_m$ to produce an output signal that is transmitted, thereby providing the required equalization time delay for the output signal to enable the output signal to be transmitted substantially simultaneously with a corresponding output signal transmitted by said other site.

16. The method of claim 15, wherein the required equalization time delay is equal to T, and wherein said digital interpolated value used to provide the required equalization time delay is $y_j(I)$ and is defined by:

$$y_j(I) = \sum_{i=0}^{c-1} a_{j,i}x(n+i-I);$$

where:

I= an index to one of the n successive sampled digital values stored and is defined by: (T div m)+ c, m being the period between the successive sampled digital values;

j= an index for the $y_j$th interpolated value used and is defined by: $(N_f-1)-$ round(rem(T/m)*$N_f$), where $N_f$ interpolation filters are used;

c−1= a maximum value of i, where c indicates a total number of terms summed to determine the digital interpolated value; and $a_{j,i}$= predefined filter coefficients used to determine the digital interpolated value.

17. The method of claim 15, wherein a total number N of the sampled digital values stored extend over a time period that exceeds a maximum required equalization time delay.

18. The method of claim 15, wherein the required equalization time delay is determined to equalize the time at which the output signal is transmitted from a plurality of sites to compensate for the time delay incurred by the analog signal traveling over different length propagation paths to the sites.

19. The method of claim 15, wherein the step of interpolating comprises the steps of:

(a) multiplying a predefined number of successive sampled digital values by a corresponding number of predefined coefficients, producing a corresponding plurality of products; and (b) determining a total of the products from step (a) above.

20. The method of claim 15, wherein the step of interpolating comprises the steps of determining an N-order series approximation of the analog input signal between successive sampled digital values, where N is a positive integer; and determining each of the plurality of digital interpolated values as a function of a desired time delay, the sampled digital values, and said N-order series approximation, an accuracy of the interpolated values improving as N increases in value.

21. The method of claim 15, further comprising the step of converting the output signal from a digital format to an analog format.

22. Apparatus for delaying a signal in order to equalize its propagation time to a transmission site relative to the propagation time for the signal to reach another transmission site, comprising:

(a) means for sampling an input signal at a first sample rate, producing a signal comprising successive sampled digital values, each sampled digital value corresponding to a value of the analog input signal at a later point in time than previously sampled digital values;

(b) memory means, coupled to receive the sampled digital values, for storing said values;

(c) processor means, coupled to selectively recall the sampled digital values stored by the memory means, for digitally filtering the signal from the means for sampling as a function of the sampled digital values stored, producing a digital interpolated value, the digital interpolated value corresponding to an estimated value of the analog input signal at a time intermediate successive pairs of the sampled digital values stored, said processor means determining the digital interpolated value so as to provide a desired time delay before said value is output; and (d) means for combining successive digital interpolated values at a predefined rate, to produce a delayed signal to enable each of the transmission sites to substantially simultaneously transmit the signal.

23. The apparatus of claim 22, further comprising a digital-to-analog converter that is coupled to receive the delayed signal and which converts the delayed signal to an analog output signal that is transmitted from a transmission site.

24. The apparatus of claim 22, wherein said processor means comprise a digital signal processor that is programmed to function as a plurality of finite impulse filters.

25. The apparatus of claim 24, wherein the digital interpolated value is determined by the digital signal processor as a function of a plurality of successive sampled digital values and corresponding predefined coefficients.

26. The apparatus of claim 22, wherein the processor means include means for determining the digital interpolated values as a, function of an N-order series approximation of the analog input signal between successive sampled digital values, where N is a positive integer; said means then determining each of the plurality of digital interpolated values as a function of a desired time delay, the sampled digital values, and said N-order series approximation.

27. The apparatus of claim 24, wherein the desired delay time includes a time interval extending over an integer number of successive sampled digital values stored by the memory means.

28. The apparatus of claim 22, wherein the processor means select an index that corresponds to the desired time delay to identify said digital interpolated value, said index identifying corresponding digital interpolated values stored during successive samples of the analog input signal, to comprise the delayed signal.

29. The apparatus of claim 22, wherein the memory means store sampled digital values determined over a time interval that exceeds a maximum desired time delay.

* * * * *